(12) United States Patent
Moeller

(10) Patent No.: US 8,434,429 B2
(45) Date of Patent: May 7, 2013

(54) PET LEASH ASSEMBLIES, PET COLLAR ASSEMBLIES, AND METHODS OF USING THE SAME

(76) Inventor: Thomas Andrew Moeller, Truckee, CA (US)

(\*) Notice: Subject to any disclaimer, the term of this patent is extended or adjusted under 35 U.S.C. 154(b) by 925 days.

(21) Appl. No.: 12/536,173

(22) Filed: Aug. 5, 2009

(65) Prior Publication Data

US 2010/0031897 A1 Feb. 11, 2010

Related U.S. Application Data

(60) Provisional application No. 61/188,050, filed on Aug. 6, 2008.

(51) Int. Cl.
*A01K 27/00* (2006.01)

(52) U.S. Cl.
USPC .......................................... 119/795; 119/779

(58) Field of Classification Search .................. 119/792, 119/779, 795, 858
See application file for complete search history.

(56) References Cited

U.S. PATENT DOCUMENTS

| | | | |
|---|---|---|---|
| 143,716 A | 10/1873 | Putnam | |
| 688,006 A | 12/1901 | Rickman | |
| 701,268 A * | 5/1902 | Howard et al. | 119/776 |
| 1,010,952 A | 12/1911 | Purves | |
| 1,144,415 A | 6/1915 | Jones | |
| 1,650,038 A | 11/1927 | Potter | |
| 2,097,070 A * | 10/1937 | Lago | 119/858 |
| 2,560,550 A | 7/1951 | Blazewicz | |
| 2,608,736 A * | 9/1952 | Blazewicz | 24/599.7 |
| 2,701,402 A * | 2/1955 | Foster | 24/600.5 |
| 2,821,169 A * | 1/1958 | Barhorst | 119/776 |
| 2,890,534 A * | 6/1959 | Robert | 40/303 |
| 4,167,156 A * | 9/1979 | Kupperman et al. | 119/795 |
| 4,197,816 A | 4/1980 | Lusch | |
| 4,404,927 A * | 9/1983 | Woutat | 119/776 |
| 4,903,638 A * | 2/1990 | Lacey | 119/776 |
| 5,005,527 A | 4/1991 | Hatfield | |
| 5,197,410 A * | 3/1993 | Wilson et al. | 119/776 |
| RE34,351 E * | 8/1993 | Lacey | 119/776 |
| 5,435,273 A | 7/1995 | Landis et al. | |
| 6,095,093 A | 8/2000 | Kisko et al. | |
| 6,230,663 B1 | 5/2001 | Welch et al. | |

(Continued)

FOREIGN PATENT DOCUMENTS

| | | |
|---|---|---|
| WO | WO 02/01943 | 1/2002 |
| WO | WO 02/096193 | 12/2002 |

*Primary Examiner* — Kristen C Hayes
(74) *Attorney, Agent, or Firm* — DASCENZO Intellectual Property Law, P.C.

(57) ABSTRACT

Pet leash assemblies, pet collar assemblies, and methods of using the same. Pet leash assemblies include a tether and a gated clasp coupled to the tether. The gated clasp includes a body, a gate hinged to the body, and a biasing member that pivotally biases the gated clasp to a closed configuration. The gate may include a projection that extends away from the body. When the projection is urged toward a terminal region of the body, the gate is pivoted against a bias of the biasing member and the gated clasp is configured to an open configuration, in which a coupling ring of a collar may be inserted into and removed from a passage defined between the gate and the body. The clasp may include a sliding actuator with a gate-engagement surface positioned to engage and pivot the gate against its bias when the actuator is translated toward the gate.

20 Claims, 4 Drawing Sheets

U.S. PATENT DOCUMENTS

| | | |
|---|---|---|
| 6,247,427 B1 | 6/2001 | DeBien |
| 6,308,662 B1 * | 10/2001 | Furman ........................ 119/776 |
| 6,629,511 B2 | 10/2003 | De Bien |
| 6,668,428 B2 | 12/2003 | Moeller |
| 6,749,150 B2 | 6/2004 | Kohlndorfer et al. |
| 6,912,736 B2 | 7/2005 | Moeller et al. |
| 6,912,975 B1 | 7/2005 | Balan |
| 7,093,330 B2 | 8/2006 | Ferguson et al. |
| 7,810,220 B2 * | 10/2010 | Anthony et al. ............. 24/599.1 |
| 2004/0208692 A1 * | 10/2004 | Anthony et al. ............. 403/327 |
| 2007/0193005 A1 | 8/2007 | Chalk |
| 2011/0154955 A1 * | 6/2011 | Fidrych ........................ 81/3.09 |

* cited by examiner

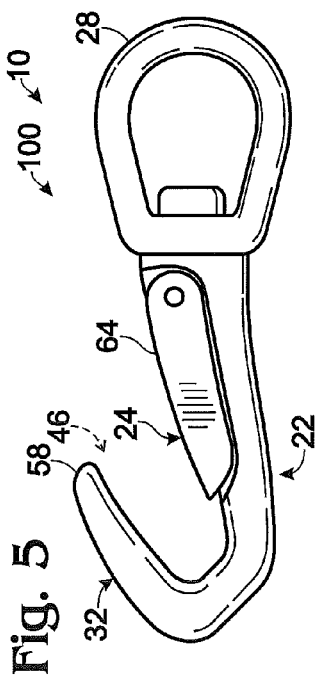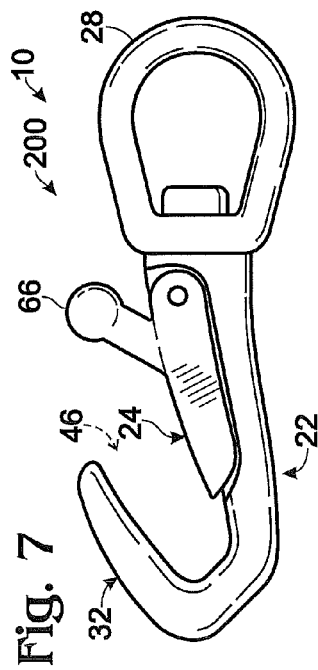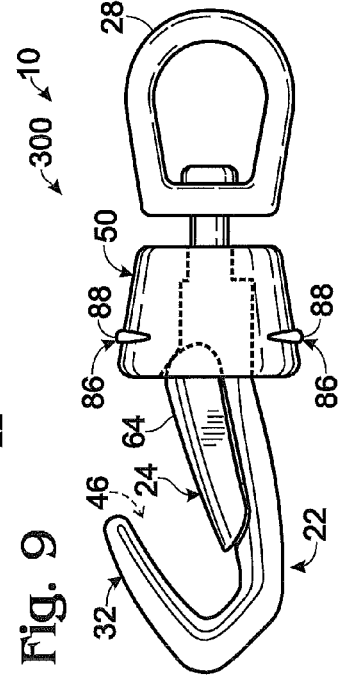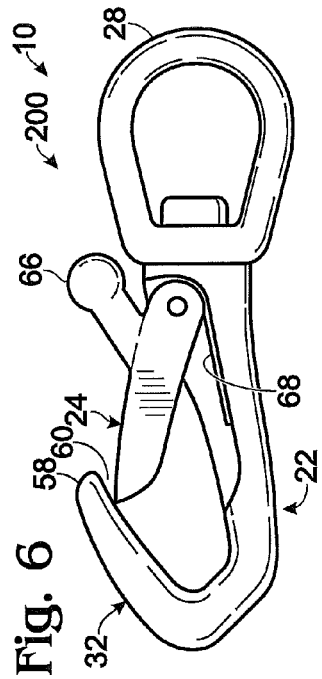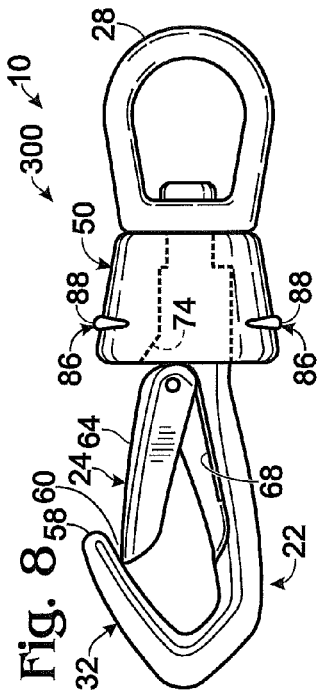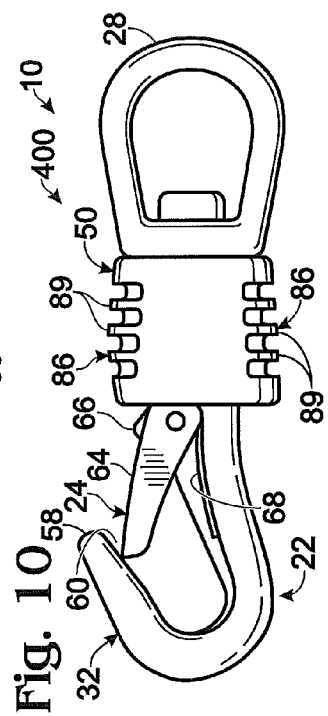
Fig. 5　Fig. 7　Fig. 9
Fig. 6　Fig. 8　Fig. 10

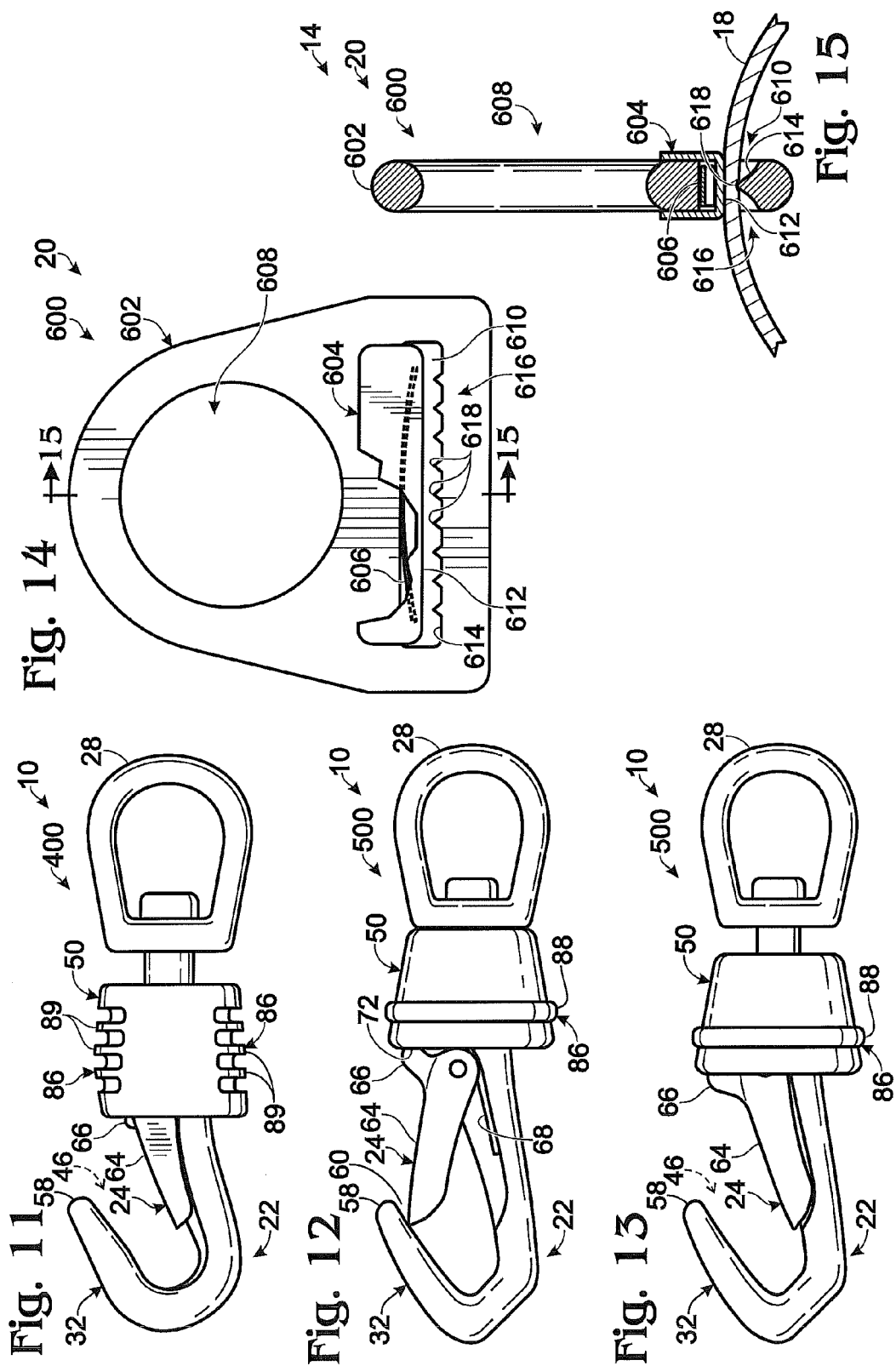

PET LEASH ASSEMBLIES, PET COLLAR ASSEMBLIES, AND METHODS OF USING THE SAME

RELATED APPLICATION

This application claims priority to U.S. Provisional Patent Application Ser. No. 61/188,050, which is entitled "CLASP WITH QUICK RELEASE AND EASY ENGAGEMENT FEATURE," was filed on Aug. 6, 2008, and the complete disclosure of which is hereby incorporated by reference.

FIELD OF THE DISCLOSURE

The present disclosure is directed to gated clasps, and more particularly to pet leash assemblies that include gated clasps, pet collar assemblies, and methods of using the same.

BACKGROUND OF THE DISCLOSURE

Over 75 million dogs are kept as pets in the United States. It is known that dogs and other pets provide benefits to their owners, from simple companionship to exercise. It is common for dogs to wear collars that include one or more of a buckle, ID tags, medical-related tags, and a D-ring for attachment to a leash. Due to the weight of these items, they generally fall to the underside of the dog's neck where they may be difficult to see and/or grasp. With long-haired dogs, these items often become at least partially buried in the dog's neck hair, making it particularly difficult to easily attach a leash to the dog's collar. Typical leashes include some form of a clasp that requires fine motor skills, or micro-movement, by the dog owner. For example, many conventional leashes include a clasp that requires sliding a gate of the clasp with a thumb. For some dog owners, such as those with arthritis, the micro-movement required makes it difficult to attach a leash to and detach a leash from a dog's collar. Even for dog owners without arthritis, these clasps may be difficult to use, such as to attach and/or release from a collar's D-ring.

SUMMARY OF THE DISCLOSURE

Pet leash assemblies according to the present disclosure are designed to be coupled to and/or decoupled from a pet collar assembly. In some embodiments, pet leash assemblies according to the present disclosure may be coupled to and/or decoupled from a pet collar assembly by utilizing one or more macro-movements by a user and without requiring micro-movements by the user. In some embodiments, micro-movements also may be used to couple and/or decouple a pet leash assembly according to the present disclosure to/from a pet collar assembly.

Pet leash assemblies according to the present disclosure include a tether and a gated clasp. The gated clasp includes a body, a gate hinged to the body, and a biasing member that pivotally biases the gated clasp to a closed configuration. The gate may include a projection that extends away from the body so that when the projection is urged generally toward a terminal region of the body, the gate is pivoted against a bias of the biasing member and the gated clasp is configured to an open configuration. When in an open configuration, a coupling ring of a pet collar may be inserted into and removed from a passage defined between the gate and the body.

In some pet leash assemblies according to the present disclosure, the gated clasp further includes a sliding actuator that is slidingly coupled to the body. The sliding actuator includes a gate-engagement surface that is positioned to engage the gate, and in some such embodiments, the projection of the gate, to pivot the gate against the bias of the biasing member when the sliding actuator is translated, or otherwise slid, toward the gate relative to the body. In some pet leash assemblies according to the present disclosure, the clasp is configured to be urged from a closed configuration to an open configuration responsive to a continuous movement of a user's hand from the tether toward the terminal region of the body. In some such embodiments, this movement engages the gate directly to pivot the gate against the bias of the biasing member. In some such embodiments, this movement engages the sliding actuator to slide the actuator toward the terminal region of the gate to pivot the gate against the bias of the biasing member to an open configuration.

BRIEF DESCRIPTION OF THE DRAWINGS

FIG. 5 is a side elevation view of the gated clasp of FIG. 4 shown in an open configuration.

FIG. 6 is a side elevation view of another illustrative, non-exclusive example of a gated clasp according to the present disclosure shown in a closed configuration.

FIG. 7 is a side elevation view of the gated clasp of FIG. 6 shown in an open configuration.

FIG. 8 is a side elevation view of another illustrative, non-exclusive example of a gated clasp according to the present disclosure shown in a closed configuration.

FIG. 9 is a side elevation view of the gated clasp of FIG. 8 shown in an open configuration.

FIG. 10 is a side elevation view of another illustrative, non-exclusive example of a gated clasp according to the present disclosure shown in a closed configuration.

FIG. 11 is a side elevation view of the gated clasp of FIG. 10 shown in an open configuration.

FIG. 12 is a side elevation view of another illustrative, non-exclusive example of a gated clasp according to the present disclosure shown in a closed configuration.

FIG. 13 is a side elevation view of the gated clasp of FIG. 12 shown in an open configuration.

FIG. 14 is a front elevation, partial fragmentary, view of an illustrative, non-exclusive example of a tether-positioning device according to the present disclosure.

FIG. 15 is a cross-sectional view of the tether-positioning device of FIG. 14, taken along line 15-15 in FIG. 14.

DETAILED DESCRIPTION AND BEST MODE OF THE DISCLOSURE

Figure 1:
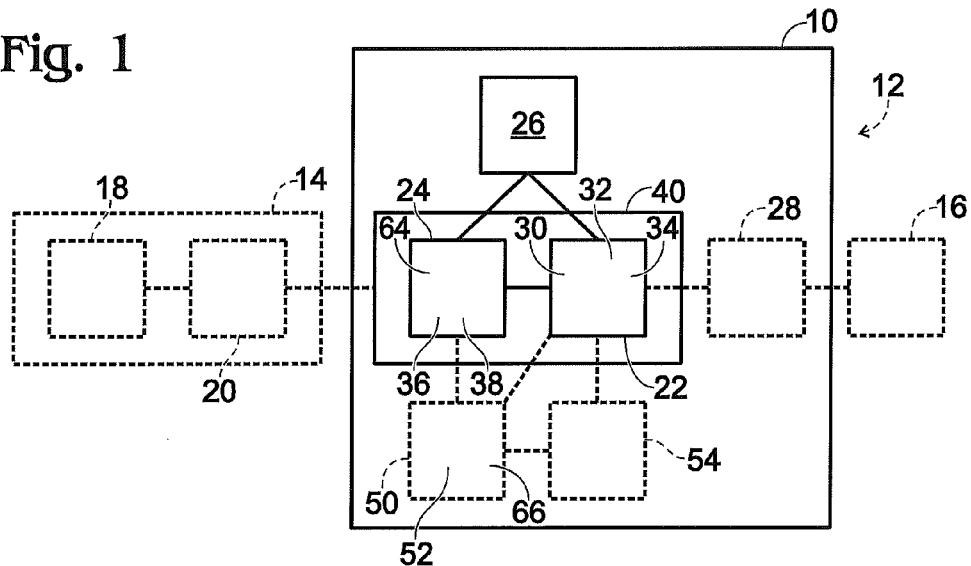
FIG. 1 is a block diagram schematically illustrating gated clasps according to the present disclosure, together with optional tethers and pet collar assemblies.

Gated clasps according to the present disclosure are schematically illustrated in FIG. 1 and are generally indicated at 10. Pet leash assemblies according to the present disclosure, which include gated clasps 10, are also schematically illustrated in FIG. 1 and are generally indicated at 12. Pet leash assemblies 12 may additionally or alternatively be described as tether assemblies 12. Finally, pet collar assemblies according to the present disclosure, which may (but are not required to) be used with pet leash assemblies 12, also are schematically illustrated in FIG. 1 and are generally indicated at 14. Gated clasps 10 and pet leash assemblies 12 according to the present disclosure may be described as being configured, or designed, to permit coupling to and/or decoupling from associated structure, such as a ring coupling or other structure of a pet collar assembly. Some embodiments of gated clasps 10 and pet leash assemblies 12 may be coupled to and/or decoupled from associated structure utilizing one or more macro-movements by a user and without requiring micro-movements by the user. Additionally or alternatively, in some embodiments, micro-movements may be used to couple and/or decouple a gated clasp and/or a pet leash assembly to/from associated structure.

A gated clasp 10 may (but is not required to) be removably or permanently coupled to a tether 16 to form a pet leash assembly 12. Accordingly, a gated clasp 10 may be selectively coupled or otherwise attached or secured to a pet collar assembly 14 worn by a dog or other animal or living creature so that the animal may be restrained with the pet leash assembly 12. As used herein, "tether" refers to any suitable structure used to tether, or otherwise secure, an animal to a person or to an object. For example, standard straps constructed of nylon webbing, chain, cable, or leather with a handle that may be used to walk a dog or other animal, and lengths of chain, cable, webbing, leather, or rope that may be used to secure a dog or other animal to an object such as a tree or a post, are all considered to be illustrative, non-exclusive examples of tethers 16 within the scope of the present disclosure.

Pet collar assemblies 14 according to the present disclosure include a collar 18 and a coupling member 20 configured to be selectively coupled to and decoupled from a leash, or other tether. As discussed, these leashes or tethers may, but are not required to, be pet leash assemblies 12 according to the present disclosure, such as which include a gated clasp 10 according to the present disclosure. As used herein, "collar" refers to any configuration of a device that is designed to be secured around a portion of an animal and thus utilized to secure the animal to a leash, such as a leash assembly 12 according to the present disclosure. As used herein, a "collar" is not limited to strap collars that are configured to be secured around the neck of an animal. Rather, harnesses that are configured to be secured around the upper torso, head, or any other portion, of an animal to be restrained, as well as other suitable animal-encircling structures, are also within the scope of the present disclosure and within the scope of "collar," as used herein.

Figure 2:
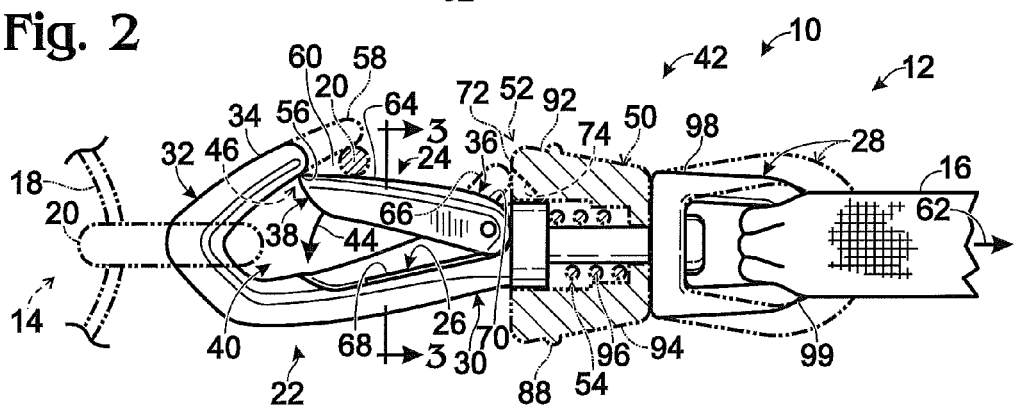
FIG. 2 is a side elevation view schematically illustrating illustrative, non-exclusive examples of gated clasps according to the present disclosure, shown together with an associated tether and an associated pet collar assembly.

Gated clasps 10 according to the present disclosure are somewhat less schematically illustrated in FIG. 2, including illustrative, non-exclusive examples of shapes, forms, proportions, optional components, etc. of gated clasps 10. With reference to both FIG. 1 and FIG. 2, gated clasps 10 according to the present disclosure include at least a body 22, a gate 24, and a biasing member 26. Body 22 is configured to be coupled to an associated tether 16, as schematically illustrated in FIG. 1. Body 12 may be removably or permanently coupled or otherwise connected to tether 16. Additionally or alternatively, body 12 may be directly connected or otherwise coupled to a tether, or body 12 may be indirectly connected to the tether, such as by an intermediate linkage. Some gated clasps 10 according to the present disclosure include a separate coupler 28 that is coupled to the body 22 of the gated clasp 10 and that is configured to be coupled directly to an associated tether 16.

Bodies 22 according to the present disclosure include a base portion 30 that is configured to be coupled to the associated tether, either directly or indirectly via an optional coupler 28, and a hook portion 32 that extends from the base portion and has a terminal region 34.

Gates 24 according to the present disclosure include a hinged end region 36 that is pivotally coupled to the body 22, and a distal end region 38 that contacts the terminal region of the hook portion of the body when the gated clasp is in a closed configuration. Distal end region 38 may additionally or alternatively be referred to herein as a closure end region.

Biasing member 26 pivotally biases the distal end region of the gate toward and into contact with the terminal region 34 of the hook portion 32 of the body 22. When the terminal region of the hook portion of the body is in contact with the distal end region of the gate, the body and the gate collectively define a closed loop 40, and the gated clasp may be described as being in a closed configuration 42, as illustrated in FIG. 2. Closed loop 40 may additionally or alternatively be referred to as a closed boundary. Conversely, when the gate is pivoted against the bias of the biasing member, as schematically illustrated by an arrow at 44, the distal end region disengages and is spaced-apart from the terminal region of the hook portion of the body to define a passage 46. In this position, or configuration, the gated clasp may be described as being in an open configuration. When the gated clasp is in an open configuration, associated structure may be selectively inserted through and removed from the passage 46 for coupling the gated clasp to the associated structure. An illustrative, non-exclusive example of such an associated structure includes a coupling member 20 of a collar assembly 14, as schematically illustrated in FIG. 1. As discussed herein, this coupling member may be or include a coupling ring, such as a D-ring, that is attached to, or otherwise extends from, the collar assembly.

As schematically illustrated in dashed lines in FIG. 1 and in dash-dot-dot lines in FIG. 2, gated clasps 10 according to the present disclosure may additionally (but are not required in all embodiments to) include a sliding actuator 50 that is slidingly coupled to the body 22. When present, sliding actuator 50 includes a gate-engagement surface 52 that is sized and positioned to engage and pivot the gate against the bias of the biasing member 26 when the sliding actuator is translated toward the gate relative to the body. That is, when a user engages the sliding actuator 50 and slides it toward the hook portion of the body, the sliding actuator urges the gate 24 against the bias of the biasing member 26 and reconfigures the gated clasp 10 from the closed configuration 42 to an open configuration. This sliding, or translating, movement of the sliding actuator may initially move the sliding actuator into engagement with the gate from a spaced-apart position, or configuration, in which the sliding actuator is disposed on the body in a spaced-apart relationship to the gate. It is also within the scope of the present disclosure that the sliding actuator is nominally disposed (i.e., positioned with respect to the body when not being urged from this position by user-applied forces) in a position in which the sliding actuator contacts the gate.

In some embodiments of gated clasps 10 according to the present disclosure, the sliding actuator 50, when present, is biased away from the gate 24, or to the right as illustrated in FIG. 2. In some such embodiments, the biasing member 26 that biases the gated clasp toward the closed configuration may be sufficient to also bias the sliding actuator away from the gate, due to the engagement between the gate and the sliding actuator. Additionally or alternatively, a gated clasp 10 that includes a sliding actuator may further (but is not required to) include at least a second biasing member 54 that biases the sliding actuator away from the gate. Stated differently, gated clasps according to the present disclosure that include a sliding actuator may include one or more biasing members that individually or collectively bias the gated clasp to a closed configuration and which optionally may bias the sliding actuator away from the gate.

In FIG. 2, illustrative, non-exclusive examples of gated clasps 10 according to the present disclosure are less schematically represented. As mentioned, gated clasps 10 may (but are not required to) include a coupler 28 that is coupled to a tether 16 to form a pet leash assembly 12 and may be used in conjunction with a pet collar assembly 14. As shown in FIG. 2, and as discussed herein, when the distal end region 38 of the gate 24 is in contact with the terminal region 34 of the hook portion 32 of the body 22 of the gated clasp 10, the gated clasp may be described as being in its closed configuration 42. In some embodiments of gated clasps according to the present disclosure, terminal region 34 may extend beyond a point of contact 56 between the gate 24 and the hook portion 32, as illustrated in dash-dot-dot lines in FIG. 2. In such embodiments, the portion of the terminal region of the hook portion that extends beyond this point of contact 56, and thus outside of closed loop 44, may be described as a nose 58 of the gated clasp. When present, nose 58 may extend, or project, relative to the gate in the closed configuration, at any desired angle and distance. In some embodiments, and as illustrated in FIG. 2, nose 58 may form an acute angle relative to the gate 24 when the gated clasp is in the closed configuration 42.

When the gated clasp is in the closed configuration, the nose 58 and the gate 24 may be described as defining a wedge, or catch, 60. In some embodiments, including the aforementioned acute-angle embodiments, the nose may extend beyond the point of contact a sufficient distance and at a suitable angle to facilitate the capture in wedge 60 of an associated structure to which a user desires coupling the gated clasp. By "capture," it is meant that the wedge is sized and shaped so that a user may easily position the wedge around, or adjacent, the associated structure to be coupled and not have the associated object slip from the wedge simply due to imprecise forces or alignment applied by the user. As an illustrative, non-exclusive example, a cross-section of a coupling member 20 of a pet collar assembly is illustrated in dash-dot-dot lines in FIG. 2 in the wedge 60. Accordingly, upon capturing the associated structure within the wedge, a user simply needs to pull on the gated clasp in the direction indicated at 62 and the associated structure will open the gate against the bias of the biasing member 26 and pass through the passage 46 and into the closed loop 40. When the associated object clears the gate, or passes through the passage, the gated clasp will automatically return to the closed configuration due to the bias of the biasing member. Accordingly, a gated clasp 10 according to the present disclosure with a nose 58 and a wedge 60 of a suitable size and shape is effective for coupling the gated clasp to an associated structure, such as the coupling member 20 of a pet collar assembly 14, without the user having to selectively open the gated clasp 10 by engaging and pressing on the gate 24 with the user's hand, such as with a user's thumb or other finger (i.e., without utilizing a micro-movement that may be difficult for some users), or by utilizing one of the other methods of opening gated clasps 10 discussed herein. The selective coupling to an associated structure, such as a pet collar assembly 14, of a gated clasp 10 having a wedge 60, may be described as a macro-movement because a user is not required to selectively open the gated clasp by engaging and pressing on the gate with his/her thumb. However, it is within the scope of the present disclosure that gated clasps 10, including gated clasps 10 having a wedge 60, may additionally or alternatively be opened using the user's thumb or finger, and thus using a micro-movement.

Illustrative, non-exclusive examples of acute angles that may be suitable for defining a wedge 60 of a gated clasp according to the present disclosure include angles in the approximately 20-80 degrees range, including (but not limited to) angles in the 20-40, 20-50, 30-50, 40-60, 50-70, and 50-80 degrees ranges, angles of 30, 40, 50, and 60 degrees, and angles of at least 30, 40, 50, and 60 degrees. Acute angles less than 20 degrees and greater than 80 degrees are also within the scope of the present disclosure, as are angles and angle ranges that are approximately any of these angles and angle ranges.

Illustrative, non-exclusive distances that a nose 58 may extend beyond the point of contact 56 with the gate 24 include distances in the 2-20 mm range, including (but not limited to) distances in the 2-6, 4-8, 6-10, 8-12, 10-14, 12-16, 14-18, and 16-20 mm ranges, distances of 5, 10, and 15 mm, and distances of at least 2, 6, 10, and 14 mm. Distances less than 2 mm and greater than 20 mm are also within the scope of the present disclosure, as are distances and distance ranges that are approximately any of these distances and distance ranges.

Additionally or alternatively, distances that a nose 58 may extend beyond the point of contact 56 with the gate 24, and/or acute angles may be defined in terms of a relation to a predetermined associated structure, such as a coupling member 20 of a pet collar assembly 14. For example, the nose may be sized and positioned to define a wedge that is sized to span at least 20 percent of a width, or diameter, of an associated structure, such as a coupling member 20 of a pet collar assembly 14, to be received through the passage 46, including wedges that are configured to span at least 40, 50, 60, 80, and 100 percent of a width or diameter of an associated structure.

Additionally or alternatively, distances that a nose 58 may extend beyond the point of contact 56 with the gate 24 may be defined in terms of a relation to a portion of the gated clasp, such as the width of a cross-section of the nose, the width of a cross-section of the terminal region 34, the width of a cross-section of the hook portion 32, etc. For example, as illustrative, non-exclusive examples, the nose 58 may extend beyond the point of contact 56 by 50-300 percent of the width of a cross-section of one of the nose, the terminal region, and the hook portion, including (but not limited to) a distance of 50-100, 75-125, 100-150, 125-175, 150-200, 175-225, 200-250, 225-275, and 250-300 percent of the width of a cross-section of one of the nose, the terminal region, and the hook portion, a distance of 50, 100, 150, 200, 250, and 300 percent of the width of a cross-section of one of the nose, the terminal region, and the hook portion, and a distance of at least 50, 100, 150, 200, 250, and 300 percent of the width of a cross-section of one of the nose, the terminal region, and the hook portion. Distances less than 50 percent and greater than 300 percent of the width of a cross-section of one of the nose, the terminal region, and the hook portion are also within the scope of the present disclosure, as are distances and distance ranges that are approximately any of these distances and distance ranges.

Gates 24 according to the present disclosure may be sized to facilitate configuring a gated clasp from its closed configuration to an open configuration. For example, a gate 24 may include an engagement surface 64 that is sized and shaped to comfortably receive a user's thumb for directly and manually pivoting the gate against the bias of the biasing member, and thus configuring the gated clasp to an open configuration. As discussed, such a method of opening a gated clasp according to the present disclosure may be described as utilizing a micro-movement by the user. Stated differently, a gate 24 according to the present disclosure may have a length that is configured to facilitate pivoting of the gate with, or by, a thumb of the user while permitting sufficient clearance and spacing for easy insertion of an associated structure through the passage between the gate and the terminal region of the hook portion of the body for coupling the gated clasp to the associated structure. That is, the gate may be sized so that the user's thumb does not obstruct passage 46 for insertion of the associated structure. As illustrative, non-exclusive examples, the engagement surface 64 of a gate 24 may have a length in the range of 10-40 mm, including (but not limited to) a length in the range of 10-20, 15-25, 20-30, 25-35, and 30-40 mm, a length of 10, 15, 20, 25, 30, 35, and 40 mm, and a length of at least 10, 15, 20, 25, 30, 35, and 40 mm. Lengths less than 10 mm and greater than 40 mm are also within the scope of the present disclosure, as are lengths and length ranges that are approximately any of these lengths and length ranges.

Additionally or alternatively, lengths of gates 24 according to the present disclosure may be defined in terms of a relation to another portion of a gated clasp. As illustrative, non-exclusive examples, a length of an engagement surface 64 of a gate 24 may be 20-80 percent of an overall length of the gated clasp or of the body of the gated clasp, including (but not limited to) a length that is 20-40, 30-50, 40-60, 50-70, and 60-80 percent of an overall length of the gated clasp or of the body of the gated clasp, and a length of at least 20, 30, 40, 50, 60, 70, and 80 percent of an overall length of the gated clasp or of the body of the gated clasp. Lengths less than 20 percent and greater than 80 percent relative to the gated clasp or the body of the gated clasp are also within the scope of the present disclosure, as are lengths and length ranges that are approximately any of these lengths and length ranges.

Figure 3:
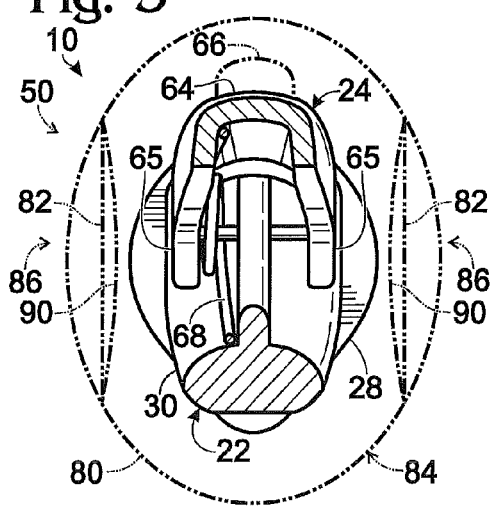
FIG. 3 is a cross-sectional view of illustrative non-exclusive examples of gated clasps according to the present disclosure, taken along line 3-3 of FIG. 2.

Additionally or alternatively, although not required, a gate 24 according to the present disclosure may have a generally U-shaped profile as illustrated in FIG. 3. As shown in the illustrative, non-exclusive example, the gate has an engagement surface 64 from which a pair of spaced-apart lateral members 65 extend toward body 22.

Gates 24 according to the present disclosure may (but are not required to) additionally include an optional projection 66 that extends from the hinged end region generally away from the body of the gated clasp, as illustrated in dash-dot-dot lines in FIG. 2. The projection may be sized and shaped to be engaged by a user and/or by an optional sliding actuator 50, as discussed herein. Accordingly, when present, the projection may be urged generally toward the terminal region 34 of the hook portion 32 of the body to pivot the gate against the bias of the biasing member 26.

As mentioned, gated clasps 10 according to the present disclosure include a biasing member 26 that pivotally biases the distal end region 38 of the gate 24 toward and into contact with the terminal region 34 of the hook portion 32 of the body 22, and thus the gated clasp to a closed configuration. Biasing member 26 may take any suitable form and may include any suitable biasing mechanism to provide the above-described biasing of the distal end region of the gate. The illustrative, non-exclusive example of a biasing member 26 illustrated in FIG. 2 is a torsion spring 68 that engages the body 22 and the gate 24. Additional illustrative, non-exclusive examples of suitable biasing members include (but are not limited to) coil springs, leaf springs, resilient foam, and any other suitable springs or resilient structures. In FIG. 3, torsion spring 68 is shown at least substantially housed, or positioned, between the body and the underside of gate 24. Moreover, in the context of the illustrated U-shaped gate, the torsion spring is also at least substantially positioned between the optional lateral members 65 of the gate. Other biasing members 26 may, but are not required to be, similarly positioned.

As mentioned, gated clasps 10 according to the present disclosure may (but are not required to) include an optional sliding actuator 50 that is slidingly coupled to the body 22. An illustrative, non-exclusive example of a sliding actuator is illustrated in dash-dot-dot lines in FIG. 2. Sliding actuators 50 according to the present disclosure include a gate-engagement surface 52 that is positioned to engage and pivot the gate against the bias of the biasing member 26 when the sliding actuator is translated, slid, or otherwise moved toward the gate relative to the body. This movement of the sliding actuator "toward the gate relative to the body" may additionally or alternatively be described as relative movement toward the hook portion of the body (and optionally, the terminal portion thereof), with this movement in some embodiments being axial movement along the body toward the hook portion (such as the terminal region thereof). In some examples of gated clasps 10 that include a sliding actuator, the gate-engagement surface may be positioned to engage the projection 66 of the gate, when present. In other examples, in which a projection 66 is not present, the gate-engagement surface 52 may be positioned to engage an actuator-engagement surface 70 of the gate. Actuator-engagement surface 70 may include, or be at least partially coextensive with, contact surface 64. It is also within the scope of the present disclosure that gated clasps 10 that include a sliding actuator 50 optionally may not include the aforementioned contact surface 60, or at least a contact surface that is sized to facilitate configuring of the gated clasp to an open configuration responsive to direct contact with the gate by a user's thumb or other finger. Other configurations are also within the scope of the present disclosure.

In some examples, gate-engagement surface 52 may include an end surface 72 of the sliding actuator that generally faces, or extends toward, the terminal region 34 of the hook portion of the body of the gated clasp. Additionally or alternatively, gate-engagement surface 52 may include an inner surface 74 that generally faces, or extends toward, the body of the gated clasp. In such embodiments in which the gate-engagement surface includes an inner surface, the sliding actuator may be described as being configured to slide toward, and at least partially over, the gate. Other configurations are also within the scope of the present disclosure.

In some examples of gated clasps 10 that include a sliding actuator 50, the sliding actuator may define a sleeve that extends around the body and that is configured to slide toward and away from the gate along a longitudinal axis of the sleeve. That is, although not required, the optional sliding actuator may completely encircle the base portion 30 of the body 22 of the gated clasp, as perhaps best seen in the cross-sectional view of FIG. 3. In such examples, the optional sliding actuator may be described as having a cross-section that is defined perpendicular to the longitudinal axis with the cross-section having a perimeter, or profile, 80. Such a cross-section may correspond to any position along the longitudinal axis of the sliding actuator, and sliding actuators are not required to have uniform cross-sections and profiles thereof along the entire length of the sliding actuator.

Some examples of sliding actuators 50 have a generally circular profile. Other examples, such as illustrated in the illustrative, non-exclusive examples of FIG. 3, include a profile 80 that is irregular or otherwise generally or completely non-circular. In such examples, the sliding actuator, or profile thereof, may be described as configured to provide tactile feedback to the user to orient the gated clasp in a predetermined orientation in the user's hand. In other words, when a user engages the sliding actuator with his/her hand, because the profile is non-circular, the user may be able to orient the gated clasp in a desired orientation simply by feel, for example, to couple the gated clasp to an associated structure, such as a coupling member of a pet collar assembly. Additionally or alternatively, the perimeter, or profile, may be asymmetrical. Additionally or alternatively, the perimeter, or profile, may include one or more flat portions 82, as optionally and schematically illustrated in FIG. 3. Additionally or alternatively, the perimeter, or profile, may be elliptical, as optionally and schematically illustrated in FIG. 3.

Additionally or alternatively, sliding actuators according to the present disclosure may be described as having an outer surface 84 that includes at least one tactile region 86 that is configured to provide tactile feedback to the user to orient the gated clasp in a predetermined orientation in the user's hand. In some such examples, the outer surface may include at least two distinct tactile regions, such as optionally and schematically illustrated in the illustrative, non-exclusive example of FIG. 3, in which the outer surface includes two flat portions 82 positioned on opposite sides of the sliding actuator. Additionally or alternatively, the outer surface may include one or more convex features. Additionally or alternatively, the outer surface may include one or more convex features 90, such as optionally and schematically illustrated in FIG. 3. Other configurations are also within the scope of the present disclosure.

Referring back to FIG. 2, the illustrative, non-exclusive example of an optional sliding actuator 50 includes a raised feature, or rib, 88, which may be described as a convex tactile region. When present, the rib may extend at least partially around the outer surface and transverse to the longitudinal axis. In such examples, the rib may be described as configured to be engaged by a user's hand to assist the user's hand in translating the sliding actuator toward the gate.

Additionally or alternatively, as illustrated in the illustrative, non-exclusive example of the sliding actuator 50 in FIG. 2, sliding actuators according to the present disclosure may include a wider portion 92 proximate the gate and a narrower portion 94 distal the gate. In other words, the outer surface of the sliding actuator may taper away from the gate. Such a configuration may provide tactile feedback to the user and may assist the user in translating the sliding actuator toward the gate of the gated clasp. Other configurations are also within the scope of the present disclosure.

As mentioned, gated clasps 10 that include an optional sliding actuator may additionally include at least a second biasing member 54 that biases the sliding actuator away from the gate, and thus the gated clasp to a closed configuration. The second biasing member 54 may take any suitable form and may include any suitable biasing mechanism to provide the biasing described herein. The illustrative, non-exclusive example of a second biasing member 54 illustrated in FIG. 2 includes a coil spring 96 that engages the body 22 and the sliding actuator 50. Additional illustrative, non-exclusive examples of suitable second biasing members include (but are not limited to) leaf springs and any other suitable springs or resilient structures. When a gated clasp 10 includes a second biasing member 54, the previously described biasing member 26 may be referred to as a first biasing member.

Alternatively, some examples of gated clasps according to the present disclosure that include an optional sliding actuator, may include a biasing member 26 that is configured to bias both the gate into contact with the terminal region of the hook portion of the body and the sliding actuator away from gate. For example, with reference to FIG. 2, and an example of a gated clasp with a projection 66 and without a second biasing member 54, the biasing member 26 may have sufficient bias to pivot the gate into contact with the terminal region while the projection engages and translates the sliding actuator away from the gate. Configurations of gated clasps having gates without a projection 66 may also be configured such that a single biasing member is configured to bias both the gate into contact with the terminal end region and the sliding actuator away from the gate.

As mentioned, some examples of gated clasps 10 according to the present disclosure may include a coupler 28 that is coupled to the body 22 of the gated clasp and that is configured to be coupled directly to an associated tether. In such a configuration, the coupler 28 may additionally or alternatively be referred to as an intermediate linkage that interconnects and couples together (permanently or removably) the gated clasp and a tether. With continued reference to FIG. 2, an illustrative, non-exclusive example of a suitable coupler 28 is shown that defines a closed loop through which a portion of a tether 16 extends. In the illustrated example, the coupler 28 is rotatably coupled to the base portion 30 of the body of the gated clasp, but a rotatable relationship to the base portion is not required when a coupler 28 is provided.

Additionally, although not required, an end region 98 of the coupler that is proximate the gate and distal the associated tether, when present, may be sized somewhat similarly to an adjacent portion of the gated clasp. For example, when a gated clasp additionally includes an optional sliding actuator 50, such as optionally illustrated in dash-dot-dot lines in FIG. 2, the end region 98 of the coupler that is proximate the sliding actuator may be sized (approximately) similar to the adjacent portion of the sliding actuator. Such a configuration, whether including an optional sliding actuator or not, may facilitate methods according to the present disclosure. For example, as discussed herein, some methods according to the present disclosure include grasping an associated tether with a user's hand and sliding the hand along the tether until the hand engages the gated clasp and causes the gate to pivot against the bias of the biasing member 26. That is, having the end region 98 of the coupler 28 sized somewhat similarly to an adjacent portion of the gated clasp may facilitate a smooth transition of the user's hand from the tether, over the coupler, and into engagement with an adjacent portion of the coupler, whether the adjacent portion is a sliding actuator, a projection, or the gate.

Additionally or alternatively, as illustrated in FIG. 2, the end region 98 of the coupler may be described as a wider portion that is proximate the body and such a coupler may include a narrower portion 99 that is distal the body 22, such as illustrated in solid lines in FIG. 2. Such a configuration may additionally or alternatively facilitate methods according to the present disclosure, in that having a narrower portion 99 distal the body may facilitate a smooth transition of the user's hand from the tether, over the coupler, and into engagement with an adjacent portion of the sliding actuator or gate. However, such a configuration is not required, and as optionally illustrated in dash-dot-dot lines in FIG. 2, a coupler 28 may have a wider portion distal the body 22. Other configurations are also within the scope of the present disclosure.

Turning now to FIGS. 4-13, illustrative, non-exclusive examples of gated clasps 10 according to the present disclosure are illustrated. Where appropriate, the reference numerals from the illustrations of FIGS. 1-3 are used to designate corresponding parts of gated clasps 10 according to the present disclosure; however, the examples of FIGS. 4-13 are non-exclusive and are intended for the purpose of illustration and not limitation of the present disclosure. That is, gated clasps 10 and pet leash assemblies 12 according to the present disclosure and the various components thereof are not limited to the specific examples disclosed and illustrated in FIGS. 4-13, and gated clasps and pet leash assemblies according to the present disclosure may incorporate any number of the various aspects, configurations, characteristics, properties, etc. illustrated and disclosed herein, as well as variations thereof without departing from the scope of the present disclosure. For purposes of brevity, each previously discussed component part, or variant thereof, may not be discussed again with respect to the embodiments of FIGS. 4-13; however, it is within the scope of the present disclosure that the previously discussed features, variants, etc. may be utilized with any one or more of the embodiments of FIGS. 4-13 in any suitable combination.

Figure 4:
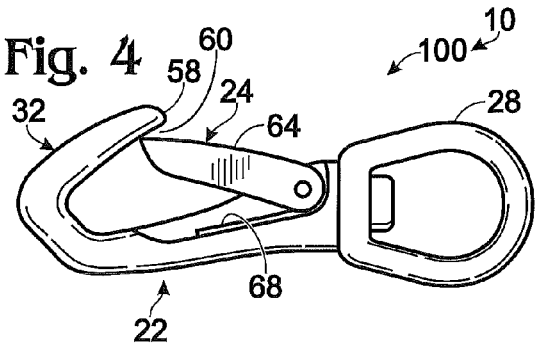
FIG. 4 is a side elevation view of an illustrative, non-exclusive example of a gated clasp according to the present disclosure shown in a closed configuration.

An illustrative, non-exclusive example of a gated clasp 10 according to the present disclosure is illustrated in FIGS. 4-5 and is generally indicated at 100. Gated clasp 100 is illustrated in a closed configuration in FIG. 4 and in an open configuration in FIG. 5. Gated clasp 100 includes a body 22, a gate 24, a (first) biasing member in the form of a torsion spring 68, and a coupler 28. Gated clasp 100 does not include a sliding actuator according to the present disclosure.

The body of gated clasp 100 includes a hook portion with a terminal region 32 having a nose 58 that extends at an acute angle beyond the point of contact between the gate and the terminal region when the gated clasp is in the closed configuration shown in FIG. 4. The nose of gated clasp 100 is configured to facilitate capture of a typical coupling member, or coupling ring, of a pet collar assembly in the wedge 60 defined by the nose and the gate.

The gate of gated clasp 100 is sized to facilitate configuring the gated clasp from its closed configuration to an open configuration, and has an engagement surface 64 that is sized and shaped to comfortably receive a user's thumb for directly and manually pivoting the gate against the bias of the torsion spring and thus the gated clasp to an open configuration. More specifically, the gate of gated clasp 100 is configured to facilitate pivoting of the gate by a thumb of a user while permitting easy insertion and/or removal of an associated structure through the passage 46 for coupling and/or decoupling, respectively, the gated clasp to and/or from the associated structure. In the illustrated example, the gate of gated clasp 100 has an engagement surface 64 with a length that is (approximately) 35 percent of an overall length of the gated clasp and (approximately) 50 percent of the length of the body of the gated clasp.

Configuring gated clasp 100 from its closed configuration to an open configuration may be accomplished in at least two ways. First, as mentioned, a user may utilize a micro-movement and simply engage the gate with his/her thumb or other finger and pivot the gate against the bias of the torsion spring. Alternatively, a user may utilize a macro-movement and grasp an associated tether that is coupled to the coupler 28, and slide his/her hand down the tether toward and into contact with the gate and then pivot the gate against the bias of the torsion spring.

Another illustrative, non-exclusive example of a gated clasp 10 according to the present disclosure is illustrated in FIGS. 6-7 and is generally indicated at 200. Gated clasp 200 is illustrated in a closed configuration in FIG. 6 and in an open configuration in FIG. 7. Similar to gated clasp 100 of FIGS. 4-5, gated clasp 200 includes a body 22, a gate 24, a (first) biasing member in the form of a torsion spring 68, and a coupler 28; however, unlike gated clasp 100, the gate of gated clasp 200 includes a projection 66 extending from the hinged end region of the gate generally away from the body of the gated clasp. The projection is sized and shaped to be engaged by a user to open the gated clasp in at least two ways.

First, a user may simply engage the projection with his/her hand, for example his/her thumb, to pivot the gate against the bias of the torsion spring, thereby configuring the gated clasp to an open configuration. Alternatively, a user may grasp an associated tether that is coupled to the coupler 28, and slide his/her hand down the tether toward and into contact with the projection and thereby pivot the gate against the bias of the torsion spring. When this latter method of opening the gated clasp is used to decouple a pet leash assembly that includes a gated clasp 200 from an associated pet collar or other structure, a continuous motion of sliding the user's hand along the tether and into contact with the projection and subsequent pivoting of the gate may result in removing the gated clasp from the pet collar or other associated structure. That is, to decouple a pet leash assembly that includes a gated clasp 200 from an associated structure, a user may (but is not required to) grasp the tether and then, in a continuous motion, slide his/her hand along the tether toward the associated structure so that his/her hand engages the projection and pivots the gate open and so that the gated clasp is removed from the associated structure.

Another illustrative, non-exclusive example of a gated clasp 10 according to the present disclosure is illustrated in FIGS. 8-9 and is generally indicated at 300. Gated clasp 300 is illustrated in a closed configuration in FIG. 8 and in an open configuration in FIG. 9. Similar to gated clasps 100 and 200 of FIGS. 4-5, and 6-7, respectively, gated clasp 300 includes a body 22, a gate 24, a (first) biasing member in the form of a torsion spring 68, and a coupler 28; however, unlike gated clasps 100 and 200, gated clasp 300 includes a sliding actuator 50 that is slidingly coupled to body 22.

The sliding actuator of gated clasp 300 includes a pair of optional table regions 86 in the form of ribs 88 extending partially around the outer surface of the sliding actuator. In the illustrated example, the ribs extend on upper and lower portions of the sliding actuator, but not on the lateral sides of the actuator. This configuration may facilitate a user rotationally positioning the gated clasp in the user's hand by tactile means, or methods. It is also in the scope of the present disclosure for such ribs or other projections on the sliding actuator (when present) to extend from the lateral sides of the sliding actuator but not the top or bottom of the sliding actuator. The sliding actuator of gated clasp 300 also includes a gate engagement surface that includes an inner surface 74 of the sliding actuator. Accordingly, when the sliding actuator is translated along its longitudinal axis toward the hook portion of the body of the gated clasp, the inner surface engages the gate. As the sliding actuator continues to translate toward the hook portion, the sliding actuator slides at least partially over the gate, and the inner surface urges the gate to pivot against the bias of the torsion spring.

Another illustrative, non-exclusive example of a gated clasp 10 according to the present disclosure is illustrated in FIGS. 10-11 and is generally indicated at 400. Gated clasp 400 is illustrated in a closed configuration in FIG. 10 and in an open configuration in FIG. 11. Similar to gated clasp 300 of FIGS. 8-9, gated clasp 400 includes a body 22, a gate 24, a (first) biasing member in the form of a torsion spring 68, a coupler 28, and a sliding actuator 50. The sliding actuator 50 of gated clasp 400 includes a pair of tactile regions 86, which similar to ribs 88 of FIGS. 8-9, may facilitate tactile orientation of the gated clasp. As illustrated, the tactile regions include a plurality of spaced-apart and optionally resilient ridges, or projections, 89.

Unlike the gate of gated clasp 300, the gate of gated clasp 400 includes a projection 66 extending from the hinged region of the gate generally away from the body of the gated clasp. Unlike the projection of gated clasp 200 of FIG. 6-7, however, the projection of gated clasp 400 is not sized and shaped to be directly engaged by a user, apart from engagement of the engagement surface 64 of the gate itself, to configure the gated clasp to an open configuration. Rather, the projection 66 of the gate of gated clasp 400 is sized to engage an inner surface of the sliding actuator. That is, when the sliding actuator of gated clasp 400 is translated along its longitudinal axis toward the hook portion of the body of the gated clasp, the inner surface engages the projection, the sliding actuator slides at least partially over the projection, and the inner surface urges the gate to pivot against the bias of the biasing member, such as torsion spring 68.

Yet another illustrative, non-exclusive example of a gated clasp 10 according to the present disclosure is illustrated in FIGS. 12-13 and is generally indicated at 500. Gated clasp 500 is illustrated in a closed configuration in FIG. 12 and in an open configuration in FIG. 13. Similar to gated clasp 400 of FIGS. 10-11, gated clasp 500 includes a body 22, a gate 24 with a projection 66, a (first) biasing member in the form of a torsion spring 68, a coupler 28, and a sliding actuator 50. The sliding actuator of gated clasp 500 includes a rib, or projection, 88 extending around the outer surface of the sliding actuator. Unlike the projection of gated clasp 400, the projection 66 of gated clasp 500 is sized and positioned to engage an end surface 72 of the sliding actuator. That is, when the sliding actuator of gated clasp 500 is translated along its longitudinal axis toward the hook portion of the body of the gated clasp, the end surface engages and urges the projection to pivot the gate against the bias of the torsion spring.

The gated clasps of FIGS. 8-13 may be opened in at least two ways. First, a user may utilize a micro-movement and simply engage the engagement surface 64 with his/her thumb and pivot the gate against the bias of the torsion spring. Alternatively, a user may utilize a macro-movement and engage the sliding actuator and translate it toward the hook portion of the body and away from the coupler of the gated clasp. When this latter method of opening a gated clasp is used to decouple a pet leash assembly that includes a gated clasp of FIGS. 8-13 from an associated pet collar or other structure, a continuous motion of sliding the user's hand along the tether and into contact with the sliding actuator and subsequent sliding of the sliding actuator toward the associated structure, the gate is automatically pivoted against the bias of the torsion spring and may result in removing the gated clasp from the pet collar or other associated structure. That is, to decouple a pet leash assembly that includes a gated clasp with a sliding actuator, such as a gated clasp 300, a gated clasp 400, or a gated clasp 500, from an associated structure, a user may grasp the tether and then, in a continuous motion, slide his/her hand along the tether toward the associated structure so that his/her hand engages the sliding actuator and slides the sliding actuator toward the associated object so that the gate pivots open and the gated clasp is removed from the associated structure.

Turning now to FIGS. 14-15, an illustrative, non-exclusive example of a coupling member 20 of a pet collar assembly 14 is illustrated and generally indicated at 600. Coupling members 600 according to the present disclosure may additionally or alternatively be described as tether-positioning devices 600. Tether-positioning devices 600 according to the present disclosure are configured to be coupled to an associated collar 18 to form a pet collar assembly 14.

Tether-positioning devices 600 are configured to be positioned on the collar so that when worn by a pet, such as a dog, the tether-positioning device will generally be located on top, or back, of the pet's neck. For example, typical pet collars include one or more of a buckle, ID tags, medical-related tags, a D-ring, and the like, which due to their combined weight, generally cause the collar to rotate around the dog's (or other pet or animal's) neck until objects are positioned proximate the underside of the pet's neck. Tether-positioning devices 600 according to the present disclosure, on the other hand, are configured to be positioned generally opposite these heavy items and thereby will be configured to remain on the top, or back, of the pet's neck to enable a user to easily couple a pet leash assembly, such as a pet leash assembly 12 according to the present disclosure, thereto. This relative positioning of the tether-positioning device in a generally opposed (or other selected) orientation relative to the buckle, tags, etc., of the collar may be accomplished by tether-positioning device 600 being adjustably positioned along the collar, and configured to be retained in a selected orientation once positioned on the collar by a user.

It is within the scope of the present disclosure that tether-positioning device 600 may be used with leash assemblies that do not include a gated clasp 10 and/or that leash assemblies 12 with a gated clasp 10 may be used with collars that do not include a tether-positioning device 600.

Tether-positioning devices 600 according to the present disclosure include a body 602, a collar-engagement member 604, and a biasing member 606. Tether-positioning devices 600 may additionally or alternatively be referred to as leash-positioning devices 600 and/or may be described as a form of a coupling ring of a collar assembly.

Body 602 defines a first passage 608 that is configured to couple the tether-positioning device to an associated pet tether, such as (but not limited to) a pet leash assembly 12 including a gated clasp 10 according to the present disclosure. Body 602 further defines a second passage 610 that is configured to receive an associated collar 18 in a sliding relation to the body 602, as seen in FIG. 15.

Body 602 and first passage 608 may be configured and sized to facilitate coupling of an associated pet leash assembly, such as (but not limited to) a pet leash assembly 12 that includes a gated clasp 10 according to the present disclosure.

Body 602 may be constructed of any suitable material including (but not limited to) aluminum, nylon, or other lightweight materials. Utilization of a lightweight material may facilitate the positioning of the tether-positioning device 600 on the top, or back, of a pet's neck. That is, body 602 and the other components of tether positioning device 600 may be constructed of one or more materials that result in the tether-positioning device being lighter than the other typical components of a pet collar assembly, such as (but not limited to) a buckle, ID tags, medical-related tags, a D-ring, etc.

The collar-engagement member 604 extends through the second passage 610 and includes a collar-engagement surface 612 that generally faces an opposing side 614 of the body 602 and that is configured to engage an associated collar 18 when a collar is received in the second passage 610. The illustrative, non-exclusive example of collar-engagement member 604 illustrated has a generally U-shaped profile, as best seen in FIG. 15; however, other configurations are also within the scope of the present disclosure that at least partially restrict the collar-engagement member from easily or inadvertently being removed from the second passage 610.

The biasing member 606 is positioned between the collar-engagement member 604 and the body 602 and biases the collar-engagement member toward the opposing side 614 of the second passage 610. Accordingly, when an associated collar 18 is received in the second passage 610, the collar is sandwiched between the collar-engagement member and the body. The illustrative, non-exclusive example of biasing member 606 illustrated is in the form of a leaf spring; however any suitable biasing member may be used. Additional illustrative, non-exclusive examples of suitable biasing members include (but are not limited to) coil springs and any other suitable springs or resilient structures. In addition to restricting sliding movement of the tether-positioning device along a collar 18, biasing member 606 optionally may bias the tether-positioning device to an orientation in which the tether-positioning device, or at least the portion of the body thereof that defines passage 608, projects generally perpendicularly, or transversely, away from the position of the collar received through passage 610.

A user may adjust the position of the tether-positioning device, when present, along a collar 18 by the user grasping the collar-engagement member 604 and urging it against the bias of biasing member 606 generally away from passage 610. Alternatively, a user may otherwise apply forces to the tether-positioning device and/or collar to urge this relative movement of the collar-engagement member against its bias. This relative movement of the collar-engagement member away from the portion of a collar that extends through passage 610 sufficiently withdraws gripping structure 616 from the collar to permit sliding of the tether-positioning device along the collar to a selected position. Upon release of the collar-engagement member by the user, biasing member 606 automatically urges the collar-engagement member (including optional gripping structure 616) back into engagement with the collar to restrict further repositioning of the tether-positioning device along the collar.

At least one of the opposing sides 614 of the second passage 610 and the collar-engagement member 604 may (but is not required to) include gripping structure 616 configured to engage an associated pet collar and at least selectively restrict the pet collar from sliding through the second passage 610. Additionally or alternatively, the gripping structure may be described as engaging the collar to restrict the tether-positioning device from sliding or otherwise being repositioned along the collar. Accordingly, in such examples of tether positioning devices 600, the second passage 610, the collar-engagement member 604, and the biasing member 606 may be described as being configured so that when the first passage 608 is urged away from the associated collar (e.g., when the pet is pulling on the tether and/or when a user is pulling on the tether), the gripping structure 616 engages the pet collar 18 and restricts it from sliding through the second passage.

The illustrative, non-exclusive example of a tether-positioning device 600 according to the present disclosure includes gripping structure 616 in the form of one or more, including a plurality of, toothed projections 618 that extend from the opposing side 614 of the second passage 610. Other configurations are also within the scope of the present disclosure.

Figure 16:
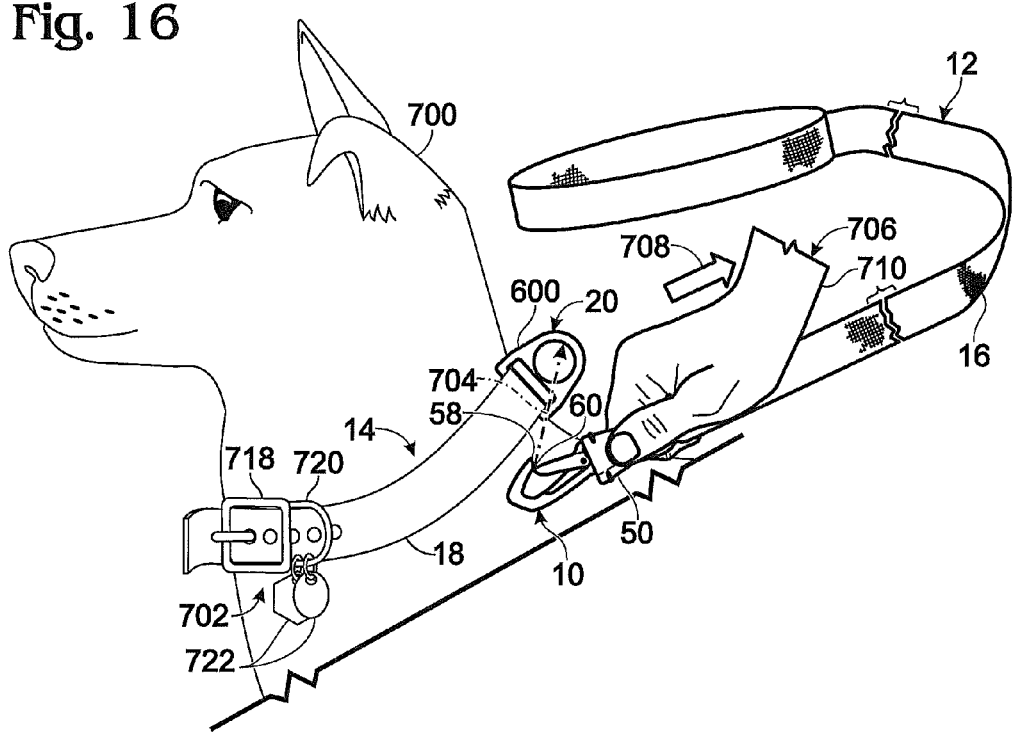
FIG. 16 is a side view of an illustrative, non-exclusive example of a pet leash assembly according to the present disclosure schematically illustrated being coupled to an illustrative, non-exclusive example of a pet collar assembly according to the present disclosure by a user, the pet collar assembly on an associated dog.
Figure 17:
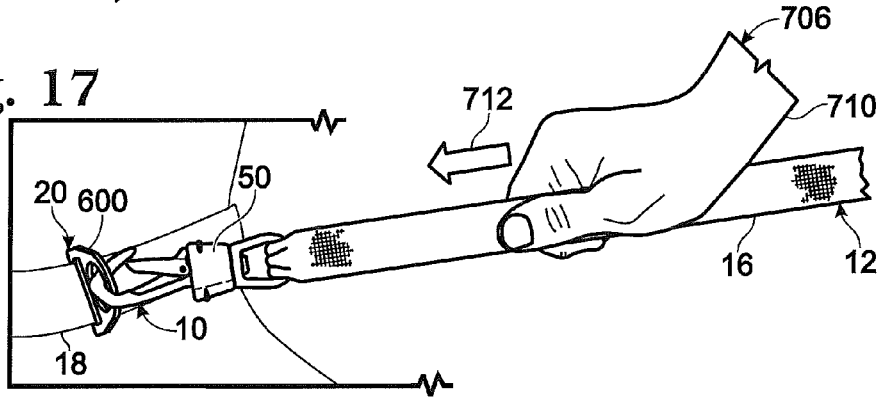
FIG. 17 is a top view of the pet leash assembly of FIG. 16 shown coupled to the pet collar assembly of FIG. 16, the user schematically illustrated in the process of uncoupling the pet leash assembly from the pet collar assembly.
Figure 18:
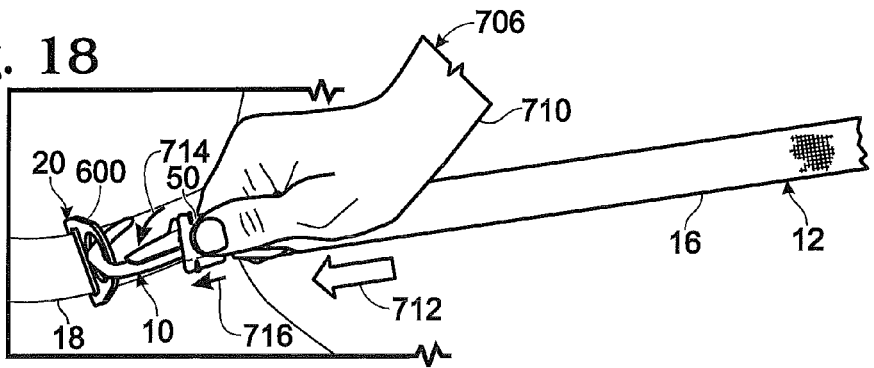
FIG. 18 is a top view of the pet leash assembly and pet collar assembly of FIG. 16 with the user schematically illustrated in the process of uncoupling the pet leash assembly from the pet collar assembly.

Finally, turning to FIGS. 16-18, illustrative, non-exclusive examples of methods according to the present disclosure are illustrated. More specifically, methods of using gated clasps 10 and pet leash assemblies 12 according to the present disclosure are illustrated. The following discussion also includes a description of methods of using the leash assemblies and gated clasps with a collar, or collar assembly, that includes an optional tether-positioning device. As discussed, a tether-positioning device 600 may be positioned on a collar 18 of a pet 700, such as a dog, so that the tether-positioning device 600 is located on top, or back, of the pet's neck, generally opposite of various other components 702 of a typical pet collar assembly 14, such as (but not limited to) a buckle 718, a D-ring 720, and miscellaneous tags 722. Typical collars are adjustable in length and may include a releasable fastener to form a closed loop around a dog's, or other pet's or animal's, neck or other body portion. In FIG. 16, the collar is illustrated with a releasable fastener in the form of a buckle 718, but it is within the scope of the present disclosure that other releasable fasteners may be utilized, such as snaps, side-release buckles, clips, and the like.

The gated clasp 10 illustrated in FIGS. 16-18 includes a sliding actuator 50 and a nose 58; however, other configurations of gated clasps according to the present disclosure may be used according to the illustrated methods of FIGS. 16-18, as discussed herein. Additionally or alternatively, and as mentioned, the methods according to the present disclosure generally illustrated in FIGS. 16-18 may be implemented using a coupling member 20 of a pet leash assembly 14 other than a tether-positioning device 600 according to the present disclosure. In other words, the specific embodiments of gated clasps 10 and coupling members 20 illustrated in FIGS. 16-18 are depicted as illustrative, non-exclusive examples only.

FIG. 16 illustrates an illustrative, non-exclusive method for attachment, or coupling, of a gated clasp 10 and associated pet leash assembly 12 to a pet collar assembly 14. Specifically, as schematically illustrated by the arrow 704, to couple the gated clasp 10 to the coupling member 20, a user 706 simply needs to position the wedge 60 of the gated clasp into engagement with the coupling member 20 of the pet collar assembly, and then pull back on the gated clasp generally along its longitudinal axis, as schematically illustrated by the arrow 708. The coupling member 20 within catch 60 will force the gate to pivot open and the gated clasp will become coupled to the coupling member 20 as the gated clasp is pulled in the general direction of arrow 708, as illustrated in FIG. 17. As discussed herein, this method of coupling a gated clasp 10 according to the present disclosure to associated structure may be described as utilizing a macro-movement.

FIGS. 17-18 collectively, and FIG. 18 alone, illustrate illustrative, non-exclusive examples of methods of decoupling a gated clasp 10 according to the present disclosure from a coupling member 20 of a pet collar assembly 14, or other associated structure, which may be described as utilizing macro-movements. With reference to FIGS. 17-18, collectively, one method of decoupling a gated clasp 10 from a coupling member 20 includes grasping the tether 16 with the user's hand 710, and sliding the hand along the tether toward the gate, as indicated by the arrow 712 in FIGS. 17-18, until the hand engages the gated clasp 10 and causes the gate to pivot against the bias of the associated biasing member, as indicated by the arrow 714 in FIG. 18. If a user continues the motion of his/her hand in the direction of sliding, the gated clasp will necessarily detach from the coupling member 20. In other words, a user may, in a continuous motion, slide his/her hand along the tether toward the pet collar, engage the gated clasp with his/her hand so that the gate pivots and opens the gated clasp and so that the gated clasp is removed from the pet collar. Such a method may be used with any of the illustrative, non-exclusive examples of gated clasps 10 according to the present disclosure. For example, in a method utilizing a gated clasp 10 having a projection 66 but not a sliding actuator 50, such as the illustrative, non-exclusive example of the gated clasp 200 illustrated in FIGS. 6-7, the sliding motion of the user's hand will cause the hand to engage the projection 66 and thereby pivot the gate against the bias of the associated biasing member. Utilizing the specific illustrative, non-exclusive example of a gated clasp 10 having a sliding actuator 50 illustrated in FIGS. 17-18, the sliding motion of the user's hand will cause the hand to engage the sliding actuator and slide it against the bias of the associated biasing member as illustrated by the arrow 716 and thereby pivot the gate into an open position, as indicated by arrow 714.

Alternatively, a method of decoupling a gated clasp 10 from a coupling member 20 of a pet collar assembly 14, or other associated structure, may include directly engaging the gated clasp as illustrated in FIG. 18, without the user first sliding his/her hand down an associated tether 16. Utilizing the specific illustrative, non-exclusive example of a gated clasp 10 having a sliding actuator 50 illustrated in FIG. 18, the user simply engages the sliding actuator 50 and slides it in the direction indicated by arrow 716. If a user continues the motion of his/her hand in the direction of arrow 716, the gated clasp will necessarily detach from the coupling member 20. In other words, a user may, in a continuous motion, slide the sliding actuator toward the pet collar so that the gate pivots and opens the gated clasp and so that the gated clasp is removed from the pet collar.

Although primarily described herein as "pet leash assemblies" and "pet collar assemblies," it is within the scope of the present disclosure that the leash assemblies, collar assemblies, and methods disclosed herein may be used with other animals and living creatures, regardless of whether or not the animal or creature is or is not a "pet." Illustrative, non-exclusive examples of such pets, animals, and/or creatures, include dogs, cats, rabbits, ferrets, iguanas, monkeys, pigs, cows, horses, sheep, and goats.

Although primarily discussed herein in relation to pet leash assemblies, gated clasps 10 according to the present disclosure may be utilized for any suitable purpose and therefore may be sized and configured to be smaller than or larger than typical clasps of pet leash assemblies. That is, gated clasps 10 according to the present disclosure are not limited to being implemented with pet leash assemblies.

The following enumerated paragraphs represent illustrative, non-exclusive ways of describing inventions according to the present disclosure.

A A gated clasp, comprising:
a body sized to be held in a user's hand, the body including a base portion and a hook portion extending from the base portion and having a terminal region;
a gate including a hinged end region and a distal end region, wherein the hinged end region is pivotally coupled to the body; and
a biasing member that pivotally biases the distal end region of the gate toward and into contact with the terminal region of the hook portion of the body;
wherein when the terminal region of the hook portion of the body is in contact with the distal end region of the gate, the body and the gate collectively define a closed loop, and wherein when the gate is pivoted against a bias of the biasing member, the distal end region disengages the terminal region of the hook portion of the body to permit selective insertion and removal of an associated structure between the gate and the terminal region of the hook portion of the body for coupling the gated clasp to the associated structure.

A1 The gated clasp of paragraph A, wherein when the distal end region of the gate is in contact with the terminal region of the hook portion of the body, the terminal region extends beyond a point of contact between the distal end region of the gate and the terminal region of the hook portion of the body at an angle to the gate and for a distance suitable to facilitate capture of the associated structure to which the user desires coupling the gated clasp.

A1.1 The gated clasp of paragraph A1, wherein the distance is at least 5 mm.

A1.2 The gated clasp of paragraph A1 or A1.1, wherein the angle is an acute angle.

A1.3 The gated clasp of paragraph A1.2, wherein the acute angle is between 20 and 70 degrees.

A2 The gated clasp of any of paragraphs A-A1.3, wherein the gate has a length greater than 20 mm.

A3 The gated clasp of any of paragraphs A-A2, wherein the gate has a length that is configured to facilitate pivoting of the gate by a thumb of the user while permitting easy insertion of the associated structure between the gate and the terminal region of the hook portion of the body for coupling the gated clasp to the associated structure.

A4 The gated clasp of any of paragraphs A-A3, wherein the gate includes a projection extending from the hinged end region away from the body, wherein when the projection is urged generally toward the terminal region of the hook portion of the body, the gate pivots against the bias of the biasing member.

A5 The gated clasp of any of paragraphs A-A4, further comprising:
a sliding actuator slidingly coupled to the body, the sliding actuator including a gate-engagement surface positioned to engage and pivot the gate against the bias of the biasing member when the sliding actuator is translated toward the gate relative to the body.

A5.1 The gated clasp of paragraph A5, wherein the sliding actuator defines a sleeve that extends around the body and is configured to slide toward and away from the gate along a longitudinal axis defined by the sleeve.

A5.1.1 The gated clasp of paragraph A5 or A5.1, wherein the sliding actuator has a cross-section defined perpendicular to the longitudinal axis, wherein a perimeter of the cross-section is generally non-circular and is configured to provide tactile feedback to the user to orient the gated clasp in a predetermined orientation in the user's hand.

A5.1.1.1 The gated clasp of paragraph A5.1.1, wherein the perimeter is asymmetrical.

A5.1.1.2 The gated clasp of paragraph A5.1.1, wherein the perimeter includes a flat portion.

A5.1.1.3 The gated clasp of paragraph A5.1, wherein the perimeter is elliptical.

A5.1.3 The gated clasp of any of paragraphs A5.1-A5.1.2, wherein the sliding actuator includes a wider portion proximate the gate and a narrower portion distal the gate.

A5.1.4 The gated clasp of any of paragraphs A5.1-A5.1.3, wherein the sliding actuator has an outer surface with a raised feature extending at least partially around the outer surface and transverse to the longitudinal axis, wherein the raised feature is configured to be engaged by the user's hand and assist the user's hand in translating the sliding actuator toward the gate.

A5.1.5 The gated clasp of any of paragraphs A5.1-A5.1.4, wherein the sliding actuator is further configured to slide toward and at least partially over the gate.

A5.2 The gated clasp of any of paragraphs A-A5.1.5, wherein the sliding actuator has an outer surface with at least one tactile region configured to provide tactile feedback to the user to orient the gated clasp in a predetermined orientation in the user's hand.

A5.2.1 The gated clasp of paragraph A5.2, wherein the at least one tactile region includes at least two distinct tactile regions.

A5.2.2 The gated clasp of any of paragraphs A5.2-A5.2.1, wherein the at least one tactile region includes a convex feature.

A5.2.3 The gated clasp of any of paragraphs A5.2-A5.2.2, wherein the at least one tactile region includes a concave feature.

A5.2.4 The gated clasp of any of paragraphs A5.2-A5.2.3, wherein the at least one tactile region includes at least two tactile regions disposed on opposite sides of the sliding actuator.

A5.3 The gated clasp of any of paragraphs A5-A5.2.4, wherein the biasing member is a first biasing member, and the gated clasp further comprises:
a second biasing member that biases the sliding actuator away from the gate.

A5.3.1 The gated clasp of paragraph A5.3, wherein the second biasing member includes a coil spring.

A5.4 The gated clasp of any of paragraphs A5-A5.3.1, wherein the gate-engagement surface includes an inner surface that faces the body.

A5.4.1 The gated clasp of paragraph A5.4, wherein the gate includes a projection extending from the hinged end region away from the body, wherein when the sliding actuator is translated toward the gate, the gate-engagement surface engages the projection and pivots the gate against the bias of the biasing member.

A5.5 The gated clasp of any of paragraphs A5-A5.4.1, wherein the gate-engagement surface includes an end surface that faces the terminal region of the hook portion.

A5.5.1 The gated clasp of paragraph A5.5, wherein the gate includes a projection extending from the hinged end region away from the body, wherein when the sliding actuator is translated toward the gate, the gate-engagement surface engages the projection and pivots the gate against the bias of the biasing member.

A6 The gated clasp of any of paragraphs A-A5.5.1, wherein the gate has a generally U-shaped profile.

A7 The gated clasp of any of paragraphs A-A6, further comprising:
a coupler coupled to the body and configured to couple the body to an associated tether.

A7.1 The gated clasp of paragraph A7, wherein the coupler is rotatably coupled to the body.

A7.2 The gated clasp of any of paragraphs A-A7.1, wherein the coupler forms a closed loop with a wider portion proximate the body and a narrower portion distal the body.

A8 The gated clasp of any of paragraphs A-A7.2, wherein the biasing member includes a torsion spring.

A9 The gated clasp of any of paragraphs A-A8, wherein the associated tether includes a pet leash with a handle.

A10 A tether assembly, comprising:
the gated clasp of any of paragraphs A-A9; and
a tether coupled to the gated clasp.

A10.1 The tether assembly of paragraph A10, further comprising:
a collar assembly including a coupling ring configured to be retained in the closed loop defined by the body and the gate of the gated clasp.

A10.2 The tether assembly of paragraphs A10-A10.1, wherein the coupling ring is a tether-positioning device adapted to be selectively positioned along the collar assembly by a user, wherein the tether-positioning device is biased to project away from a portion of the collar assembly that is received through the tether-positioning device.

A10.3 The tether assembly of paragraph A10.2, wherein the tether-positioning device comprises:
a body that defines:
a first passage configured to couple the tether positioning device to an associated pet tether; and
a second passage configured to receive an associated pet collar in a sliding relation to the body;
a collar engagement member extending through the second passage; and
a biasing member engaged with the body and the collar engagement member, the biasing member configured to urge the collar engagement member toward an opposing side of the second passage.

A10.4 The tether assembly of any of paragraphs A10-A10.3, wherein the gated clasp is configured to permit insertion and removal of the associated structure between the gate and the terminal region of the hook portion of the body in response to the user grasping the tether with a hand and the user sliding the hand along the tether toward the gate.

A10.5 A method of decoupling the tether assembly of any of paragraphs A10-A10.4 from an associated structure, the method comprising:
grasping the tether with a hand; and
sliding the hand along the tether toward the gate until the hand engages the gated clasp and causes the gate to pivot against the bias of the biasing member.

B A tether-positioning device for use on a pet collar, the tether-positioning device comprising
a body that defines:
a first passage configured to couple the tether-positioning device to an associated pet tether; and
a second passage configured to receive an associated pet collar in a sliding relation to the body;
a collar-engagement member extending through the second passage; and
a biasing member engaged with the body and the collar-engagement member, the biasing member configured to urge the collar-engagement member toward an opposing side of the second passage.

B1 The tether-positioning device of paragraph B, wherein at least one of the opposing side of the second passage and the collar-engagement member includes gripping structure for engaging the associated pet collar; and
wherein the biasing member is further configured to urge the associated pet collar into engagement with the gripping structure.

B1.1 The tether-positioning device of paragraph B1, wherein the gripping structure includes at least one toothed projection.

B1.2 The tether-positioning device of paragraph B1, wherein the second passage, the collar-engagement member, and the biasing member are configured so that:
when the first passage is urged away from the associated pet collar, the gripping structure engages the associated pet collar and restricts the pet collar from sliding through the second passage; and
when the first passage is one of not urged away from the associated pet collar and urged toward the associated pet collar, the associated pet collar is permitted to slide through the second passage.

B2 The tether-positioning device of any of paragraphs B-B1.1 in combination with the associated pet collar.

B3 The tether-positioning device of any of paragraphs B-B2 in combination with the associated pet tether.

B4 The tether-positioning device of any of paragraphs B-B3, wherein the associated pet tether includes a pet leash with a handle.

B5 The tether-positioning device of any of paragraphs B3-B4, wherein the pet tether includes the gated clasp of any of paragraphs A-A8.

C A pet leash assembly, comprising:
  a tether; and
  a gated clasp including:
    a body sized to be held in a user's hand, the body including a base portion coupled to the tether, and a hook portion extending from the base portion and having a terminal region;
    a gate including a hinged end region and a distal end region, wherein the hinged end region is pivotally coupled to the body, and wherein the gate further includes a projection extending from the hinged end region away from the body; and
    a biasing member that pivotally biases the distal end region of the gate toward and into contact with the terminal region of the hook portion of the body;
    wherein when the terminal region of the hook portion of the body is in contact with the distal end region of the gate, the body and the gate collectively define a closed loop, and wherein when the projection is urged generally toward the terminal region of the hook portion of the body, the gate is pivoted against a bias of the biasing member and the distal end region disengages the terminal region of the hook portion of the body to permit selective insertion and removal of a coupling ring of a pet collar between the gate and the terminal region of the hook portion of the body for securing the pet leash assembly to the pet collar.

C1 The pet leash assembly of paragraph C, wherein when the distal end region of the gate is in contact with the terminal region of the hook portion of the body, the terminal region extends beyond a point of contact between the distal end region of the gate and the terminal region of the hook portion of the body at an acute angle to the gate and for a distance greater than 5 mm.

C1.1 The pet leash assembly of paragraph C1, wherein the acute angle is between 20 and 70 degrees.

C2. The pet leash assembly of any of paragraphs C-C1.1, wherein the gated clasp further includes:
  a sliding actuator slidingly coupled to the body, the sliding actuator including a gate-engagement surface positioned to engage the projection and pivot the gate against the bias of the biasing member when the sliding actuator is translated toward the gate relative to the body.

C2.1 The pet leash assembly of paragraph C2, wherein the sliding actuator defines a sleeve that extends around the body and is configured to slide toward and away from the gate along a longitudinal axis defined by the sleeve.

C2.2 The pet leash assembly of any of paragraphs C2-C2.1, wherein the sliding actuator has a cross-section defined perpendicular to the longitudinal axis, wherein a perimeter of the cross-section is generally non-circular and is configured to provide tactile feedback to the user to orient the gated clasp in a predetermined orientation in the user's hand.

C2.3 The pet leash assembly of any of paragraphs C2-C2.2, wherein the sliding actuator includes a wider portion proximate the gate and a narrower portion distal the gate.

C2.4 The pet leash assembly of any of paragraphs C2-C2.3, wherein the sliding actuator has an outer surface with a raised feature extending at least partially around the outer surface and transverse to the longitudinal axis, wherein the raised feature is configured to be engaged by the user's hand and assist the user's hand in translating the sliding actuator toward the gate.

C2.5 The pet leash assembly of any of paragraphs C2-C2.4, wherein the sliding actuator is further configured to slide toward and at least partially over the gate.

C2.6 The pet leash assembly of any of paragraphs C2-C2.5, wherein the sliding actuator has an outer surface with at least one tactile region configured to provide tactile feedback to the user to orient the gated clasp in a predetermined orientation in the user's hand.

C2.7 The pet leash assembly of any of paragraphs C2-C2.6, wherein the biasing member is a first biasing member, and the gated clasp further includes:
  a second biasing member that biases the sliding actuator away from the gate.

C2.8 The pet leash assembly of any of paragraphs C2-C2.7, wherein the gate-engagement surface includes an inner surface and faces the body.

C2.9 The pet leash assembly of any of paragraphs C2-C2.8, wherein the gate-engagement surface includes an end surface and faces the terminal region of the hook portion.

C2.10 A method of opening the gated clasp of the pet leash assembly of any of paragraphs C2-C2.9, the method comprising:
  engaging the sliding actuator with a hand; and
  sliding the sliding actuator toward the hook portion of the body with the hand so that the gate is pivoted against the bias of the biasing member and the distal end region of the gate disengages the terminal region of the hook portion of the body.

C2.10.1 The method of paragraph C2.10, further comprising before the engaging:
  grasping the tether with the hand; and
  sliding the hand along the tether toward the sliding actuator.

C3 The pet leash assembly of any of paragraphs C-C2.9 in combination with a pet collar assembly, wherein the pet collar assembly includes:
  a collar; and
  a tether-positioning device including:
    a device body that defines:
      a first passage configured to couple the tether-positioning device to the gated clasp of the pet leash assembly; and
      a second passage, through which the collar extends in a sliding relation to the device body;
    a collar-engagement member extending through the second passage; and
    a second biasing member engaged with the device body and the collar-engagement member, the second biasing member configured to urge the collar-engagement member toward an opposing side of the second passage.

C4 A method of opening the gated clasp of the pet leash assembly of paragraph C, the method comprising:
  engaging the projection with a hand; and
  urging the projection toward the terminal region of the hook portion of the body with the hand so that the gate is pivoted against the bias of the biasing member and the distal end region of the gate disengages the terminal region of the hook portion of the body.

C4.1 The method of paragraph C4, further comprising before the engaging:
  grasping the tether with the hand; and
  sliding the hand along the tether toward projection.

D A pet leash assembly, comprising:
  a tether; and a gated clasp including:
  a body sized to be held in a user's hand, the body including a base portion coupled to the tether, and a hook portion extending from the base portion and having a terminal region;
  a gate including a hinged end region and a distal end region, wherein the hinged end region is pivotally coupled to the body;
  a biasing member that pivotally biases the distal end region of the gate toward and into contact with the terminal region of the hook portion of the body; and
  a sliding actuator slidingly coupled to the body, the sliding actuator including a gate-engagement surface positioned to engage the gate and pivot the gate against the bias of the biasing member when the sliding actuator is translated toward the gate relative to the body;
  wherein when the terminal region of the hook portion of the body is in contact with the distal end region of the gate, the body and the gate collectively define a closed loop, and wherein when the sliding actuator is urged generally toward the terminal region of the hook portion of the body, the sliding actuator engages the gate and pivots the gate against a bias of the biasing member and the distal end region disengages the terminal region of the hook portion of the body to permit selective insertion and removal of a coupling ring of a pet collar between the gate and the terminal region of the hook portion of the body for securing the pet leash assembly to the pet collar;
  wherein when the distal end region of the gate is in contact with the terminal region of the hook portion of the body, the terminal region extends beyond a point of contact between the distal end region of the gate and the terminal region of the hook portion of the body at an acute angle to the gate and for a distance greater than 5 mm.

E A method of decoupling a pet leash assembly from a pet collar, wherein the pet leash assembly includes a tether and a gated clasp coupled to the tether, and further wherein the gated clasp includes a body and a gate hinged to the body, the method comprising:
  grasping the tether with a hand;
  in a continuous motion, sliding the hand along the tether toward the pet collar and engaging the gated clasp with the hand so that the gate pivots and opens the gated clasp and so that the gated clasp is removed from the pet collar.

E1 The method of paragraph E,
  wherein the gated clasp further includes a sliding actuator slidingly coupled to the body, the sliding actuator including a gate-engagement surface positioned to engage and pivot the gate;
  wherein the engaging the gated clasp with the hand includes engaging the sliding actuator with the hand; and
  wherein the sliding the hand includes sliding the sliding actuator toward the pet collar.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in various combinations and subcombinations of features, functions, elements, properties, steps and/or methods may be claimed through amendment of the present claims or presentation of new claims in this application or in a related application. Such amended or new claims, whether they are directed to a different invention or directed to the same invention, whether different, broader, narrower, or equal in scope to the original claims, are also regarded as included within the subject matter of the present disclosure.

INDUSTRIAL APPLICABILITY

The pet leash assemblies, pet collar assemblies, and methods of the present disclosure are applicable to the pet and animal products industries.

The invention claimed is:
1. A pet leash assembly, comprising:
a tether; and
a gated clasp including:
  a body sized to be held in a user's hand, the body including a base portion coupled to the tether, and a hook portion extending from the base portion and having a terminal region;
  a gate including a hinged end region and a distal end region, wherein the hinged end region is pivotally coupled to the body, and wherein the gate further includes a projection extending transversely from the hinged end region away from the body; and
  a biasing member that pivotally biases the distal end region of the gate toward and into contact with the terminal region of the hook portion of the body;
  wherein when the terminal region of the hook portion of the body is in contact with the distal end region of the gate, the body and the gate collectively define a closed loop, and wherein when the projection is urged generally toward the terminal region of the hook portion of the body, the gate is pivoted against a bias of the biasing member and the distal end region disengages the terminal region of the hook portion of the body to permit selective insertion and removal of a coupling ring of a pet collar between the gate and the terminal region of the hook portion of the body for securing the pet leash assembly to the pet collar.

2. The pet leash assembly of claim 1, wherein when the distal end region of the gate is in contact with the terminal region of the hook portion of the body, the terminal region extends beyond a point of contact between the distal end region of the gate and the terminal region of the hook portion of the body at an acute angle to the gate and for a distance greater than 5 mm.

3. The pet leash assembly of claim 2, wherein the acute angle is between 20 and 70 degrees.

4. The pet leash assembly of claim 1, wherein the gated clasp further includes:
   a sliding actuator slidingly coupled to the body, the sliding actuator defining a longitudinal axis and including a gate-engagement surface positioned to engage the projection and pivot the gate against the bias of the biasing member when the sliding actuator is translated along the longitudinal axis toward the gate relative to the body.

5. The pet leash assembly of claim 4, wherein the sliding actuator defines a sleeve that extends around the body and is configured to slide toward and away from the gate along a longitudinal axis defined by the sleeve.

6. The pet leash assembly of claim 4, wherein the sliding actuator has a cross-section defined perpendicular to the longitudinal axis, wherein a perimeter of the cross-section is generally non-circular and is configured to provide tactile feedback to the user to orient the gated clasp in a predetermined orientation in the user's hand.

7. The pet leash assembly of claim 4, wherein the sliding actuator includes a wider portion proximate the gate and a narrower portion distal the gate.

8. The pet leash assembly of claim 4, wherein the sliding actuator has an outer surface with a raised feature extending at least partially around the outer surface and transverse to the longitudinal axis, wherein the raised feature is configured to be engaged by the user's hand and assist the user's hand in translating the sliding actuator toward the gate.

9. The pet leash assembly of claim 4, wherein the sliding actuator is further configured to slide toward and at least partially over the gate.

10. The pet leash assembly of claim 4, wherein the sliding actuator has an outer surface with at least one tactile region configured to provide tactile feedback to the user to orient the gated clasp in a predetermined orientation in the user's hand.

11. The pet leash assembly of claim 4, wherein the biasing member is a first biasing member, and the gated clasp further includes:
    a second biasing member that biases the sliding actuator away from the gate.

12. The pet leash assembly of claim 4, wherein the gate-engagement surface includes an inner surface and faces the body.

13. The pet leash assembly of claim 4, wherein the gate-engagement surface includes an end surface and faces the terminal region of the hook portion.

14. The pet leash assembly of claim 4, wherein the sliding actuator permits a user to grasp the tether with a hand and (i) slide the hand toward and into engagement with the sliding actuator, and (ii) translate with the hand the sliding actuator along the longitudinal axis, so that the gate-engagement surface engages the projection and pivots the gate against the bias of the biasing member to open the gated clasp.

15. The pet leash assembly of claim 1 in combination with a pet collar assembly, wherein the pet collar assembly includes:
    a collar; and
    a leash-positioning device including:
       a device body that defines:
          a first passage configured to couple the leash-positioning device to the gated clasp of the pet leash assembly; and
          a second passage, through which the collar extends in a sliding relation to the device body;
       a collar-engagement member extending through the second passage; and
       a second biasing member engaged with the device body and the collar-engagement member, the second biasing member configured to urge the collar-engagement member toward an opposing side of the second passage.

16. A method of opening the gated clasp of the pet leash assembly of claim 4, the method comprising:
    engaging the sliding actuator with a hand; and
    sliding the sliding actuator toward the pet collar with the hand so that the gate is pivoted against the bias of the biasing member and the distal end region of the gate disengages the terminal region of the hook portion of the body.

17. The method of claim 16, further comprising before the engaging:
    grasping the tether with the hand; and
    sliding the hand along the tether toward the sliding actuator.

18. A method of opening the gated clasp of the pet leash assembly of claim 1, the method comprising:
    engaging the projection with a hand; and
    urging the projection toward the terminal region of the hook portion of the body with the hand so that the gate is pivoted against the bias of the biasing member and the distal end region of the gate disengages the terminal region of the hook portion of the body.

19. The method of claim 18, further comprising before the engaging:
    grasping the tether with the hand; and
    sliding the hand along the tether toward the projection.

20. A pet leash assembly, comprising:
    a tether; and
    a gated clasp including:
       a body sized to be held in a user's hand, the body including a base portion coupled to the tether, and a hook portion extending from the base portion and having a terminal region;
       a gate including a hinged end region and a distal end region, wherein the hinged end region is pivotally coupled to the body, and wherein the gate includes a projection extending from the hinged end region away from the body;
       a biasing member that pivotally biases the distal end region of the gate toward and into contact with the terminal region of the hook portion of the body; and
       a sliding actuator slidingly coupled to the body, the sliding actuator including a gate-engagement surface configured to engage the projection and pivot the gate against a bias of the biasing member when the sliding actuator is translated toward the gate relative to the body;
       wherein when the terminal region of the hook portion of the body is in contact with the distal end region of the gate, the body and the gate collectively define a closed loop, and wherein when the sliding actuator is urged generally toward the terminal region of the hook portion of the body, the sliding actuator engages the projection and pivots the gate against the bias of the biasing member and the distal end region disengages the terminal region of the hook portion of the body to permit selective insertion and removal of a coupling ring of a pet collar between the gate and the terminal region of the hook portion of the body for securing the pet leash assembly to the pet collar; and
       wherein when the distal end region of the gate is in contact with the terminal region of the hook portion of the body, the terminal region extends beyond a point of contact between the distal end region of the gate and the terminal region of the hook portion of the body at an acute angle to the gate.

* * * * *